Feb. 25, 1958     R. R. BERGHOFF     2,825,024
VOLTAGE STABILIZING SYSTEM
Filed June 12, 1957
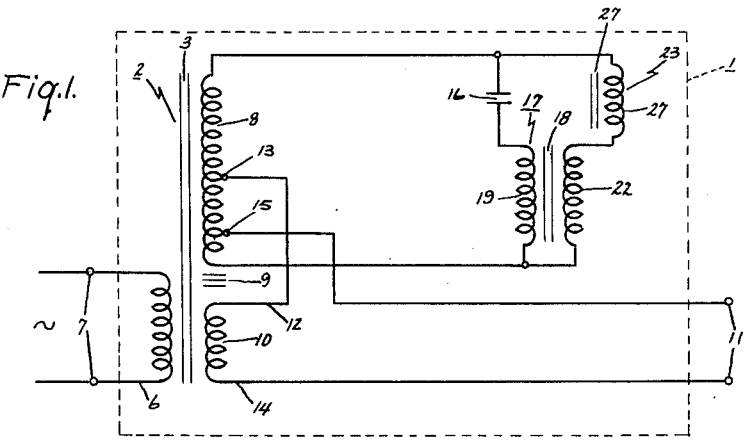
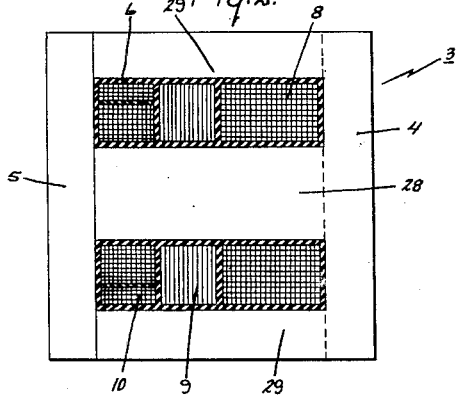
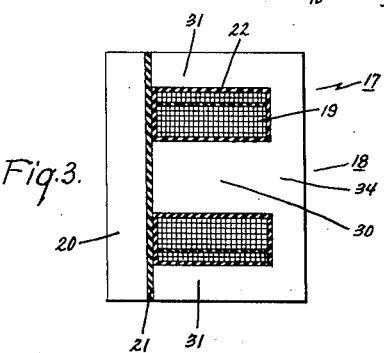
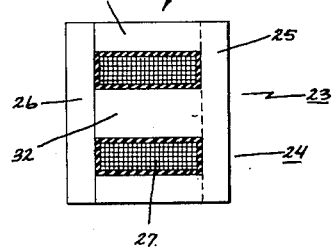
Inventor:
Robert R. Berghoff,
by Robert G. Irish
His Attorney.

United States Patent Office 2,825,024
Patented Feb. 25, 1958

2,825,024

VOLTAGE STABILIZING SYSTEM

Robert R. Berghoff, Fort Wayne, Ind., assignor to General Electric Company, a corporation of New York Application June 12, 1957, Serial No. 665,183

6 Claims. (Cl. 323—61)

This invention relates to alternating current voltage stabilizers which provide a substantially constant alternating current output voltage over substantial variations in the alternating current input voltage, and more particularly to voltage stabilizing systems providing for filtering of harmonics contained in the output voltage.

Voltage stabilizers of the type employing a high reactance transformer with a capacitor connected in parallel across the secondary winding, or a part thereof, are well known in the art. The mode of operation of such stabilizers is now well understood and it will be sufficient to state that the capacitor is proportioned to draw leading current thereby causing the core of the transformer to operate in the saturated region, i. e., above the knee of its saturation curve; when so operated, the secondary winding of the transformer becomes in effect a non-linear reactor. Such a circuit may be conventionally represented by an equivalent circuit having a linear reactor connected in series between the source and the load and a non-linear reactor and the capacitor connected respectively in parallel across the load (it being assumed that the desired voltage step-up or step-down has already been provided). It will readily be seen that if the applied voltage tends to increase, the core of the non-linear reactor will be driven further into saturation, i.e., further out on the horizontal portion of its saturation curve, and that its inductance (and hence reactance) will therefore decrease, as is well known in the art. The increase in applied voltage tends to force more current through the parallel combination of the non-linear reactor and the capacitor, however, by virtue of its decreased reactance, a greater proportion of this increased current will be diverted through the non-linear reactor thereby causing the voltage drop across the capacitor and hence the output voltage to tend to remain substantially constant.

It is well known that due to the presence of the capacitor in the circuit and the operation of the core of the transformer in the saturated region, voltage stabilizers of this type tend to have third, fifth, seventh and higher odd harmonics present in the output voltage. There are certain applications for voltage stabilizers in which it is highly desirable that the output voltage be substantially sinusoidal, i. e., not containing any appreciable amount of harmonics. It is therefore desirable in such installations that the harmonics be filtered from the output voltage. This filtering has, in the past, been accomplished by providing a plurality of tuned filter circuits connected across the output, each filter circuit comprising a capacitor and a reactor and the several filter circuits being respectively tuned to the third, fifth and seventh harmonics. While such arrangements provide satisfactory output voltage wave form which is substantially devoid of harmonics, the necessity of providing a plurality of separate capacitors and reactors has added appreciably to the cost and over-all size and weight of the device. It is therefore desirable to provide a voltage stabilizing system having an output voltage low in harmonic content in which the filtering action is accomplished by simpler circuitry and fewer components than prior systems.

It is, therefore, an object of this invention to provide an improved voltage stabilizing system having an output voltage low in harmonic content.

Another object of this invention is to provide an improved voltage stabilizing system having an output voltage low in harmonic content in which the filtering action is accomplished by simpler circuitry and fewer components than prior systems.

Further objects and advantages of this invention will become apparent by reference to the following description and the accompanying drawing, and the features of novelty which characterize this invention will be pointed out with particularity in the claims annexed to and forming a part of this specification.

It will be readily understood that in voltage stabilizing systems of the type here under consideration, the harmonics present in the output voltage are caused by the development of a voltage containing harmonics across the capacitor, which voltage is in turn caused by virtue of the saturated condition of the transformer core. Since in order to secure the voltage stabilizing action, the core must be driven into saturation, the harmonic content of the current through the capacitor cannot be greatly reduced and thus, in turn, the harmonic content of the voltage across the capacitor likewise cannot be greatly reduced. However, it is possible to add to the voltage across the capacitor another voltage of the proper magnitude and phase and having harmonics which will substantially cancel the harmonics in the voltage developed across the capacitor. My invention, in its broader aspects therefore provides a linear reactor-transformer connected in circuit with the capacitor and proportioned to be resonant therewith to the third harmonic of the line frequency so as to develop a third harmonic voltage across the linear reactor-transformer winding. A non-linear saturating reactor is further provided having its winding connected in circuit with the linear reactor-transformer winding and arranged to draw current containing substantial amounts of fifth, seventh and higher odd harmonics thereby developing a voltage containing these harmonics across the linear reactor winding. A linear reactor-transformer winding is arranged so that the harmonic voltages developed thereacross are substantially out of phase with the harmonic voltages developed across the capacitor thereby substantially cancelling the same so that the voltage across the output circuit is low in harmonic content.

In the drawing, Fig. 1 is a schematic illustration of my improved voltage stabilizing system;

Fig. 2 is a cross sectional view of the preferred form of the high reactance transformer of the circuit of Fig. 1;

Fig. 3 is a cross sectional view of the preferred form of linear reactor-transformer of the circuit of Fig. 1; and Fig. 4 is a cross sectional view of the preferred form of non-linear saturating reactor of the circuit of Fig. 1.

Referring now to Fig. 1, the voltage stabilizing system 1 of this invention includes a high reactance transformer 2 having a magnetic core 3 formed of suitable magnetic material. As shown in Fig. 2, the core 3 may be formed of a stacked plurality of relatively thin E-shaped and I-shaped laminations 4 and 5 alternately stacked as is well known in the art. The primary winding 6 is positioned on core 3 and is connected across alternating input terminals 7 which are in turn adapted to be connected to an external source of alternating current of predetermined frequency (not shown), such as 115 volts, 60 cycles.

A first secondary winding 8 is positioned on core 3 and loosely coupled to primary winding 6. As shown in Fig.

2, this may be accomplished by separating primary winding 6 and secondary winding 8 by suitable magnetic shunts 9 as is well known in the art. Another secondary winding 10 is provided on core 3, closely coupled to the primary winding 6, as for example by being wound thereover as shown in Fig. 2. A pair of output terminals 11 are provided adapted to be connected to the desired load and it will be seen that one end 12 of secondary winding 10 is connected to tap 13 on secondary winding 8 and its other end 14 is connected to one of the output terminals 11, the other output terminal being connected to another tap 15 of secondary winding 8. It will now be seen that secondary winding 10 is auto transformer-connected with that part of secondary winding 8 between taps 13 and 15 across the output terminals 11.

In order to provide the voltage stabilizing action, a capacitor 16 is provided connected across secondary winding 8 and proportioned to draw leading current therethrough so that the portion of core 3 under the secondary winding 8 will be operated in the saturated region. Linear reactor-transformer 17 is provided having a core 18 with a first winding 19 thereon, winding 19 being connected in series with capacitor 16. As shown in Fig. 3 linear reactor-transformer 17 is formed of a stacked plurality of E-shaped laminations 34 and I-shaped laminations 20 of magnetic material separated by a non-magnetic spacer 21 to provide an air gap in the well known manner. Linear reactor-transformer 17 is also provided with another winding 22 which may be wound over the winding 19 as shown in Fig. 3. It will be readily understood that linear reactor-transformer 17 is designed to have its core 18 operated in its non-saturated region, i. e., below the knee of its saturation characteristic.

A non-linear reactor 23 is provided having a closed core 24 preferably formed of a stacked plurality of alternate E- and I-shaped laminations 25 and 26 as shown in Fig. 4. Non-linear reactor 24 has a winding 27 serially connected with winding 22 of linear reactor-transformer 17 across the serially connected capacitor 16 and winding 19 of linear reactor-transformer 17. It will be readily understood the non-linear reactor 23 has its core 24 operating in its saturated region, i. e., above the knee of its saturation characteristic.

The operation of the basic voltage stabilizer, i. e., the combination of high reactance transformer 2 and capacitor 16 is as described hereinbefore. In order to filter out the undesired harmonics in the output voltage appearing across output terminals 11, winding 19 of linear reactor-transformer 17 is so proportioned that the series circuit it forms with capacitor 16 is resonant to the third harmonic of the frequency of the applied voltage and thus, a third harmonic voltage is developed across winding 19. Since reactor 23 is of the non-linear, saturating type, the current drawn through the series circuit consisting of winding 27 of non-linear reactor 23 and winding 22 of linear reactor-transformer 17 will have fifth, seventh and higher odd harmonics due to the saturation of core 24 of non-linear reactor 23 and thus the voltage developed across winding 22 of linear reactor 15 will have fifth, seventh and higher odd harmonics. The voltage developed across winding 22 is induced in winding 19 by transformer action and thus the net voltage appearing across winding 19 is composed of third, fifth, seventh and higher odd harmonics. Since in the loop circuit, comprising winding 19 of linear reactor-transformer 17, capacitor 16 and secondary winding 8 of transformer 2, the voltages developed across winding 19 and capacitor 16 will add, it will be seen that winding 19 may be designed and arranged so that the voltage developed thereacross is of the proper magnitude and in phase opposition to the voltage developed across capacitor 16 so that the harmonic voltages developed across winding 19 will cancel the harmonic voltages developed across capacitor 16, so that the voltage which appears across the series combination of capacitor 16 and winding 19 will be very low in harmonic content. Since it will be readily apparent that the voltage across capacitor 16 and winding 19 of linear reactor-transformer 17 is the same voltage as appears across secondary winding 8 of transformer 2, a portion of which is added to the voltage appearing across secondary winding 10 to form the output voltage, the voltage output of the stabilizer system will also have a low harmonic content.

A voltage stabilizer system in accordance with the figures of the drawing has been constructed in which the core 3 of transformer 2 had a stack height of 3$^{11}/_{16}$ inches, a length of 6¾ inches and a width of 5⅝ inches with center leg 28 being 1$^{13}/_{16}$ inches wide and the side legs 29 being 1⅛ inches wide. Primary winding 6 was formed of 70 turns of .0856 inch diameter wire, secondary winding 8 was formed of 224 turns of .0856 inch diameter wire and secondary winding 10 was formed of 6 turns of .0856 inch diameter wire. Magnetic shunts 9 were 1.305 inches wide and respectively defined .019 inch shunt air gaps with center leg 28. Core 18 of linear reactor-transformer 17 had a stack height of 2½ inches and was 4⅞ inches long and 4$^{1}/_{16}$ inches wide. The I-shaped laminations 20 were 1$^{3}/_{16}$ inch wide with center leg 30 being 1⅝ inches wide and the outside legs 31 being 1$^{3}/_{16}$ inch wide. Winding 34 was formed of 130 turns of .0763 inch diameter wire and winding 22 was formed of 270 turns of .0285 inch diameter wire. Air gap 21 of reactor-transformer 17 was .040 inch wide. The core 24 of non-linear reactor 23 had a stack height of 1$^{7}/_{32}$ inches with center leg 32 being 1¼ inches wide and with the outside legs 33 being ⅝ inch wide. Winding 27 was formed of 660 turns of .0285 inch diameter wire. Capacitor 16 had a capacitance of 24 microfarads. With this construction and with a nominal alternating current input voltage of 115 volts, 60 cycles, it was found that the input voltage across terminals 7 could be varied from 95 volts to 130 volts with voltage across output terminals 11 varying between 115.0 volts and 116.2 volts. It was further found that the output voltage across output terminals 11 had a 1.85 to 4.0 percent harmonic content at full load and no load respectively as compared from nine to thirty percent of harmonics in the case of a conventional voltage stabilizer of the type here under consideration having an un-filtered output.

It will now be readily seen that I have provided an improved voltage stabilizer system having a filtered output to remove undesired harmonics in the output voltage, this system utilizing only two additional reactors to provide the filtering action with no additional capacitors banks being required in contrast with prior systems in which three additional reactors and three capacitor banks were employed in a filtering circuit to remove third, fifth, and seventh harmonics.

While I have illustrated and described a specific embodiment of this invention, further modifications and improvements will occur to those skilled in the art. I desire that it be understood therefore that this invention is not limited to the specific form shown and I intend in the appended claims to cover all modifications which do not depart from the spirit and scope of this invention.

What I claim as new and desire to secure by Letters Patent of the United States is:

1. A voltage stabilizing system providing an output voltage low in harmonic content comprising: a high reactance transformer having a magnetic core with a primary and a secondary winding thereon, said secondary winding being loosely coupled to said primary winding; a pair of alternating current input terminals adapted to be connected to a source of alternating current voltage of predetermined frequency; said primary winding being connected across said alternating current input terminals; an output circuit connected across at least a part of said secondary winding; a linear reactor-transformer having a magnetic core with windings thereon; a capacitor connected in circuit across at least a part of said transformer secondary winding and proportioned to draw leading current therethrough thereby causing saturation of said transformer core and the development of a voltage containing substantial amounts of 3rd, 5th, 7th and higher odd harmonics of said predetermined frequency across said capacitor, said linear-transformer reactor winding being connected in circuit with said capacitor and being proportioned to be resonant therewith for the 3rd harmonic of said predetermined frequency thereby developing a 3rd harmonic voltage across said linear reactor winding; and a non-linear saturating reactor having a core with a winding thereon, said non-linear reactor winding being connected in circuit with said linear reactor-transformer winding and being proportioned to draw current containing substantial amounts of 5th, 7th and higher odd harmonics of said predetermined frequency thereby developing a voltage containing 5th, 7th and higher odd harmonics across said linear reactor winding; said linear reactor-transformer winding being arranged so that the harmonic voltages developed thereacross are substantially in phase opposition with said harmonic voltages developed across said capacitor thereby substantially cancelling the same whereby the voltage across said output circuit is low in harmonic content.

2. A voltage stabilizing system providing an output voltage low in harmonic content comprising: a high reactance transformer having a magnetic core with a primary and a secondary winding thereon, said secondary winding being loosely coupled to said primary winding; a pair of alternating current input terminals adapted to be connected to a source of alternating current voltage of predetermined frequency; said primary winding being connected across said alternating current input terminals; an output circuit connected across at least a part of said secondary winding; a linear reactor-transformer having a magnetic core with a winding thereon; a capacitor serially connected with said linear reactor-transformer winding across at least a part of said transformer secondary winding, said capacitor being proportioned to draw leading current through said transformer secondary winding thereby causing saturation of said transformer core and the development of a voltage containing substantial amounts of 3rd, 5th, 7th and higher odd harmonics of said predetermined frequency across said capacitor; said serially connected capacitor and said linear reactor-transformer winding being proportioned to be resonant to the 3rd harmonic of the predetermined frequency thereby developing a 3rd harmonic voltage across said linear reactor-transformer winding; and a non-linear saturating reactor having a core with the winding thereon, said non-linear reactor winding being connected in circuit with said linear reactor-transformer winding and being proportioned to draw current containing substantial amounts of 5th, 7th and higher odd harmonics of said predetermined frequency thereby developing a voltage containing 5th, 7th and higher odd harmonics across said linear reactor-transformer winding; said linear reactor-transformer winding being arranged so that the harmonic voltages developed thereacross are substantially in phase opposition with said harmonic voltages developed across said capacitor thereby substantially cancelling the same whereby the voltage across said output circuit is low in harmonic content.

3. A voltage stabilizing system providing an output voltage low in harmonic content comprising: a high reactance transformer having a magnetic core with a primary and a secondary winding thereon, said secondary winding being loosely coupled to said primary winding; a pair of alternating current input terminals adapted to be connected to a source of alternating current voltage of predetermined frequency; said primary winding being connected across said alternating current input terminals; an output circuit connected across at least a part of said secondary winding; a linear reactor-transformer having a magnetic core with a pair of closely coupled windings thereon; a capacitor serially connected with one of said linear reactor-transformer windings across at least a part of said transformer secondary winding, said capacitor being proportioned to draw leading current through said transformer secondary winding thereby causing saturation of said transformer core and the development of a voltage containing substantial amounts of 3rd, 5th, 7th and higher odd harmonics of said predetermined frequency across said capacitor, said serially connected capacitor and said first linear reactor-transformer winding being proportioned to be resonant to the 3rd harmonic of said predetermined frequency thereby developing a 3rd harmonic voltage across said first linear reactor-transformer winding; and a nonlinear saturating reactor having a core with a winding thereon, said non-linear reactor winding being connected in series with said second linear reactor-transformer winding across said serially connected capacitor in said first linear reactor-transformer winding, said non-linear reactor winding being proportioned to draw current containing substantial amounts of 5th, 7th and higher odd harmonics of said predetermined frequency thereby developing a voltage containing the same harmonics across said second linear reactor-transformer winding and inducing a voltage containing the same harmonics in said first linear reactor-transformer winding by transformer action; said first linear reactor-transformer winding being arranged so that the harmonic voltages developed thereacross are substantially in phase opposition with said harmonic voltages developed across said capacitor thereby substantially cancelling the same whereby the voltage across said output circuit is low in harmonic content.

4. A voltage stabilizing system providing an output voltage low in harmonic content comprising: a high reactance transformer having a magnetic core with a primary winding and two secondary windings thereon, one of said secondary windings being loosely coupled to said primary winding and the other being closely coupled thereto; a pair of alternating current input terminals adapted to be connected to a source of alternating current voltage of predetermined frequency; said primary winding being connected across said alternating current input terminals; a pair of output terminals; said other secondary winding being autotransformer connected with at least a part of said first secondary winding across said output terminals; a linear reactor-transformer having a magnetic core with a pair of closely coupled windings thereon; a capacitor serially connected with one of said linear reactor-transformer windings across at least a part of said first secondary winding, said capacitor being proportioned to draw leading current through said first secondary winding thereby causing saturation of said transformer core and the development of a voltage containing substantial amounts of 3rd, 5th, 7th and higher odd harmonics of said predetermined frequency across said capacitor, said serially connected capacitor and said first linear reactor-transformer winding being proportioned to be resonant to the 3rd harmonic of said predetermined frequency thereby developing a 3rd harmonic voltage across said first linear reactor-transformer winding; and a non-linear saturating reactor having a core with a winding thereon, said non-linear reactor winding being connected in series with said second linear reactor-transformer winding across said serially connected capacitor and said first linear reactor-transformer winding, said non-linear reactor winding being proportioned to draw current containing substantial amounts of 5th, 7th and higher odd harmonics of said predetermined frequency thereby developing a voltage containing the said harmonics across said second linear reactor-transformer winding and inducing a voltage containing the same harmonics in said first linear reactor-transformer winding by transformer action; said first linear reactor-transformer winding being arranged so that the harmonic voltages developed thereacross are substantially in phase opposition with said harmonic voltages developed across said capacitor thereby substantially cancelling the same whereby the voltage across said output circuit is low in harmonic content.

5. A voltage stabilizing system providing an output voltage low in harmonic content comprising: a high reactance transformer having a magnetic core with a primary and a secondary winding thereon, said secondary winding being loosely coupled to said primary winding; a pair of alternating current input terminals adapted to be connected to a source of alternating current voltage of predetermined frequency; said primary winding being connected across said alternating current input terminals; an output circuit connected across at least a part of said secondary winding; a linear reactor-transformer having a magnetic core with an air gap and a winding thereon; a capacitor serially connected with one of said linear reactor-transformer windings across at least a part of said transformer secondary winding, said capacitor being proportioned to draw leading current through said transformer secondary winding thereby causing saturation of said transformer core and the development of a voltage containing substantial amounts of 3rd, 5th, 7th and higher odd harmonics of said predetermined frequency across said capacitor, said serially connected capacitor and said first linear reactor-transformer winding being proportioned to be resonant to the 3rd harmonic of said predetermined frequency thereby developing a 3rd harmonic voltage across said first linear reactor-transformer winding; and a non-linear saturating reactor having a closed core with a winding thereon, said non-linear reactor winding being connected in series with said second linear-transformer reactor winding across said serially connected capacitor and said first linear reactor-transformer winding, said non-linear reactor winding being proportioned to draw current containing substantial amounts of 5th, 7th and higher odd harmonics of said predetermined frequency thereby developing a voltage containing the same harmonics across said second linear reactor-transformer winding and inducing a voltage containing the same harmonics in said first linear reactor-transformer winding by transformer action; said first linear reactor-transformer winding being arranged so that the harmonic voltages developed thereacross are substantially in phase opposition with said harmonic voltages developed across said capacitor thereby substantially cancelling the same whereby the voltage across said output circuit is low in harmonic content.

6. A voltage stabilizing system providing an output voltage low in harmonic content comprising: a high reactance transformer having a magnetic core with a primary winding and two secondary windings thereon, one of said secondary windings being spaced from said primary winding by magnetic shunts, the other of said secondary windings being closely coupled to said primary winding; a pair of alternating current input terminals adapted to be connected to a source of alternating current voltage of predetermined frequency; said primary winding being connected across said alternating current input terminals; a pair of output terminals; said other secondary winding being autotransformer connected with at least a part of said first secondary winding across said output terminals; a linear reactor-transformer having a magnetic core with an air gap and a winding thereon; a capacitor serially connected with one of said linear reactor-transformer windings across at least a part of said transformer secondary winding, said capacitor being proportioned to draw leading current through said transformer secondary winding thereby causing saturation of said transformer core and the development of a voltage containing substantial amounts of 3rd, 5th, 7th and higher odd harmonics of said predetermined frequency across said capacitor, said serially connected capacitor and said first linear reactor-transformer winding being proportioned to be resonant to the 3rd harmonic of said predetermined frequency thereby developing a 3rd harmonic voltage across said first linear reactor-transformer winding; and a non-linear saturating reactor having a closed core with a winding thereon, said non-linear reactor winding being connected in series with said second linear reactor-transformer winding across said serially connected capacitor and said first linear reactor-transformer winding, said non-linear reactor winding being proportioned to draw current containing substantial amounts of 5th, 7th, and higher odd harmonics of said predetermined frequency thereby developing a voltage containing the same harmonics across said second linear reactor-transformer winding and inducing a voltage containing the same harmonics in said first linear reactor-transformer winding by transformer action; said first linear reactor-transformer winding being arranged so that the harmonic voltages developed thereacross are substantially in phase opposition with said harmonic voltages developed across said capacitor thereby substantially cancelling the same whereby the voltage across said output circuit is low in harmonic content.

No references cited.